(No Model.)
J. KOENIG, Jr.
FIFTH WHEEL.
No. 588,644. Patented Aug. 24, 1897.
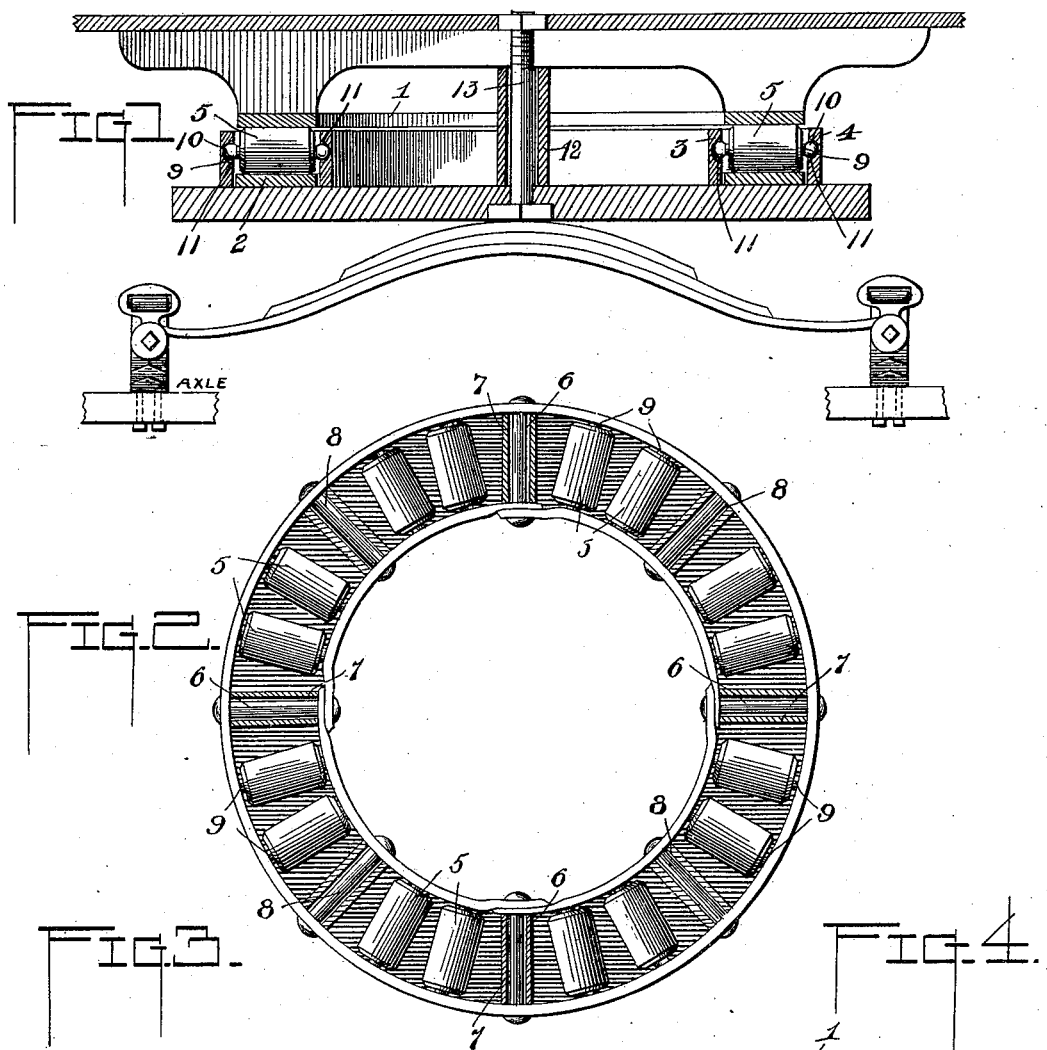
Witnesses
O. Seiffert.
Edwin Cruse.
Inventor
Joseph Koenig Jr.
By his Attorneys,
C. A. Snow & Co.

UNITED STATES PATENT OFFICE.

JOSEPH KOENIG, JR., OF QUINCY, ILLINOIS.

FIFTH-WHEEL.

SPECIFICATION forming part of Letters Patent No. 588,644, dated August 24, 1897.

Application filed February 24, 1897. Serial No. 624,805. (No model.)

*To all whom it may concern:*

Be it known that I, JOSEPH KOENIG, Jr., a citizen of the United States, residing at Quincy, in the county of Adams and State of Illinois, have invented a new and useful Fifth-Wheel, of which the following is a specification.

This invention relates to fifth-wheels, its object being to improve the construction of devices of this character and to provide a simple, inexpensive, and efficient one which may be readily applied to an ordinary running-gear and which will reduce the friction to a minimum.

My invention is also designed to be applied to all of the fifth-wheels now in common use without having to change or remove any of the old parts.

With these ends in view my invention consists in the several details of construction and combination of parts hereinafter fully described, and particularly pointed out in the claims.

In the drawings, Figure 1 is a vertical section showing my device applied to a vehicle, only such parts of the vehicle as are necessary to illustrate the application of my invention being shown. Fig. 2 is a plan view of the fifth-wheel with the top plate removed. Fig. 3 is a view of one of the rollers detached. Fig. 4 is a sectional view through one side of the fifth-wheel, on an enlarged scale.

Similar reference-numerals indicate similar parts in the several figures.

1 and 2 represent the upper and lower annular bearing-plates, the upper one being attached to the body of the vehicle in any approved manner and the lower one being attached in any suitable manner to the running-gear.

3 and 4 indicate inner and outer concentric rings, and these rings serve as bearings for the series of rollers, (indicated by 5.) The inner ring 4 is made up of a series of sections, the ends of which overlap each other, and are secured together by bolts or rivets 6, which pass through the overlapping ends and also extend across the space between the two rings and through the outer ring.

7 represents a thimble surrounding the bolt 6 and extending between the rings 3 and 4 to brace and space them apart the proper distance. Preferably other rivets and thimbles are used to connect and space apart the inner and outer rings midway between the ends of the several sections, as indicated at 8. The rivets may be secured in position by burring their ends, or either end of the rivet may be threaded to receive a nut.

The object of making the inner ring in sections is to facilitate the assembling together of the parts and also the removal of any of the rollers should they become damaged in such a manner as to necessitate their removal, and also to give access to the rollers for the purpose of removing any extraneous matter which might accumulate within the casing and prevent the free rotation of the rollers.

The rollers 5 are solid and have projecting from each end a short pintle, (indicated by 9,) the outer ends of which pintles are preferably enlarged and ball shape in form, as indicated by 10. The rings 3 and 4 are provided in their opposing faces with a series of concavities 11, adapted to receive the rounded ends 10 of the pintles and thereby form bearings in which the rollers are free to rotate. The concavities do not extend through the rings 3 and 4, and consequently the rings will not be weakened to the extent they would be if the openings extended entirely through them. This form of bearing also reduces the friction, and as no openings are formed through the rings the bearings are protected against dust, &c. The rollers are so arranged that their upper surfaces project above the upper edges of the rings 3 and 4, but the rings preferably extend below their lower surfaces to a sufficient extent to embrace the edges of the lower plate 2.

In order to apply my improvement to fifth-wheels already in use, which consist only of the two annular plates working one upon the other, the rings in which the rollers are supported are fitted over the annular plate attached to the running-gear and the upper plate, which is connected to the vehicle, will rest upon the upper surfaces of the rollers. Preferably a thimble 12 will be fitted over the king-bolt 13, between the parts of the body of the vehicle and the running-gear to which the respective plates are attached, and this thimble will be of a length corresponding to the diameter of the rollers. As neither the upper or lower plates is connected to the rings in which the rollers are journaled the parts will not be liable to bind together.

Another advantage of my construction is that as the rollers are solid and only the rounded ends of their pintles engage the recesses in the rings there is much less friction than would be the case if the rollers were mounted on spindles extending entirely through them, which is the construction generally in use.

The rollers will preferably be made of steel and case-hardened, and the upper and lower plates will also preferably be made of steel.

It will be understood that changes in the form, proportion, and minor details of construction may be resorted to without departing from the spirit or sacrificing any of the advantages of this invention.

Having thus described my invention, what I claim is—

1. In a fifth-wheel, the combination with independent inner and outer rings having a series of concave recesses in their opposing faces, of a series of rollers having integral end pintles with rounded extremities to engage in said recesses, the recesses being so arranged that the rollers will project above the upper edges of the rings, substantially as described.

2. In a fifth-wheel, the combination of outer and inner concentric rings, the independent inner ring being made in sections, the ends of adjacent sections overlapping and being detachably connected together, and a series of rollers journaled in said rings, substantially as described.

3. In a fifth-wheel, the combination of outer and inner concentric rings, the inner ring being made in sections with the ends of adjacent sections overlapping, bolts passing through the overlapping ends and through the outer ring to detachably connect the sections together, thimbles surrounding the bolts between the rings to space said rings apart, and a series of rollers journaled in said rings to revolve between them, substantially as described.

4. In a fifth-wheel, the combination of outer and inner concentric rings, the inner ring being made in sections detachably connected together, said rings having a series of concave recesses in their opposing faces, and a series of solid rollers having end pintles with rounded extremities to engage in said recesses, substantially as and for the purpose specified.

5. In a fifth-wheel, the combination of outer and inner concentric rings, the inner ring being made in sections, the ends of adjacent sections being overlapped, bolts passing through the overlapped ends and the outer ring to detachably connect them together, and similar bolts connecting the outer rings and the sections intermediate the ends of the latter, thimbles surrounding said bolts between the rings to brace and space the rings, and a series of rollers journaled in said rings to revolve between them, substantially as described.

In testimony that I claim the foregoing as my own I have hereto affixed my signature in the presence of two witnesses.

JOSEPH KOENIG, JR.

Witnesses:
GERHARD G. ARENDS, Jr.,
WILLIAM SIELEMONN.